Aug. 23, 1966 N. E. WELLS 3,267,502
FLEXIBLE MOUNTING FOR ROTATABLE MEMBERS
Filed Feb. 19, 1965 2 Sheets-Sheet 1
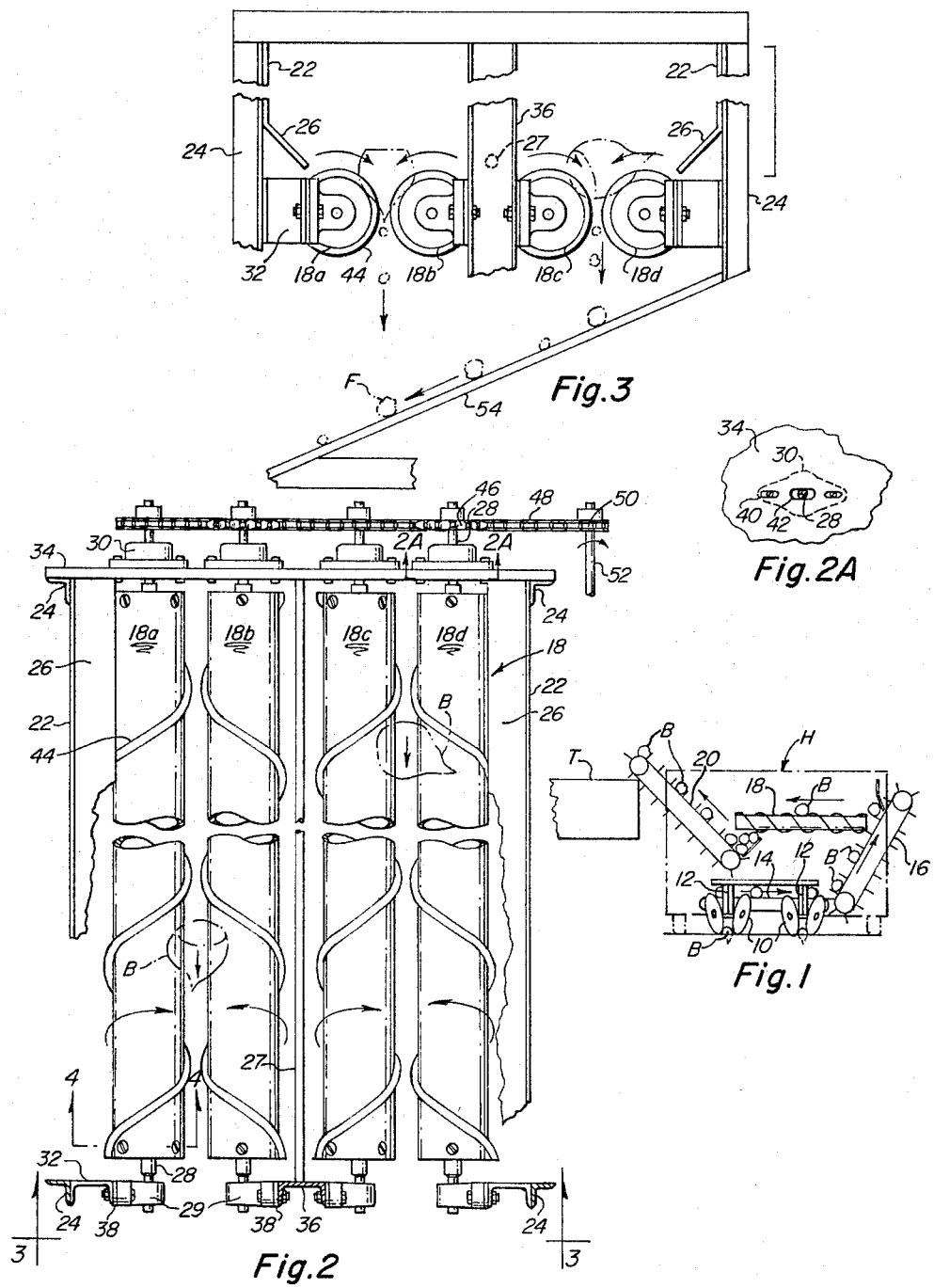
NOVELL E. WELLS
INVENTOR
BY
BUCKHORN, BLORE, KLARQUIST & SPARKMAN
ATTORNEYS Aug. 23, 1966  N. E. WELLS  3,267,502
FLEXIBLE MOUNTING FOR ROTATABLE MEMBERS
Filed Feb. 19, 1965  2 Sheets-Sheet 2

NOVELL E. WELLS
INVENTOR
BY
BUCKHORN, BLORE, KLARQUIST & SPARKMAN
ATTORNEYS

# United States Patent Office 3,267,502
Patented August 23, 1966

3,267,502
FLEXIBLE MOUNTING FOR ROTATABLE MEMBERS
Novell E. Wells, 927 Ranch Road, Boise, Idaho
Filed Feb. 19, 1965, Ser. No. 433,976
9 Claims. (Cl. 15—3.11)

The present invention relates to a flexible mounting for rollers and other rotatable members, and more particularly to a flexible mounting which enables lateral separation of a pair of parallel shaft-driven rolls to permit objects to pass downwardly therebetween.

Although the invention is described hereinafter with respect to a set of cleaning rolls for use in a beet or other crop harvester, the invention is not so limited, as it has application with respect to any member rotatable about its own axis.

In beet and other crop harvesters utilizing pairs of oppositely rotating cleaning rolls for removing dirt and other foreign matter from the crop, and in other apparatus utilizing similar pairs of closely spaced parallel rolls which rotate in opposite directions to convey and process material, it is desirable to provide some means for separating the pairs of rolls when foreign objects such as rocks and clods of dirt become wedged between such rolls so as to permit such objects to pass therebetween and thus prevent jamming of the rolls.

In the past separation has been achieved by mounting the shaft for at least one of a pair of rolls against a spring mechanism which permits the shaft, and thus the entire roll, to shift laterally when a hard object becomes wedged between the rolls. However, such spring mechanisms cannot be adequately shielded so that when used in conjunction with cleaning rolls such mechanisms become caked with mud, grease and other matter, and soon become inoperative. Provision of lateral shifting movement of the drive shaft in a roll also has an inherent disadvantage in that when the shaft moves, the drive means therefor must also be made to move, thus requiring very complex drive mechanisms which are also subject to failure and are difficult and expensive to install, maintain and replace. Rolls having outer casings made of depressible elastomer material such as rubber to enable displacement of the outer surface of the roll while the shaft remains stationary have been suggested to overcome the problems of spring-mounted shafts, but such flexible rolls are expensive to produce, wear out rapidly, and have limited utility since many applications require rigid metal rolls.

Accordingly, a primary object of the present invention is to provide a flexible mounting for rotatable members that eliminates the above objections.

More specifically, an object is to provide a flexible mounting which permits a rotatable member to be displaced laterally without displacing laterally its axis of rotation.

Another object is to provide a flexible mounting for a shaft-driven roll which permits lateral displacement of the roll relative to its drive shaft so that the shaft and its associated drive mechanism can be stationarily mounted.

Another object is to provide a flexible mounting for a roll which enables lateral displacement of the outer portion of the roll and yet permits the outer portion of the roll to be made of rigid material and permits the shaft for the roll to be fixed against lateral movement.

A further object is to provide a pair of parallel, shaft-driven rolls capable of lateral separating movement relative to one another without necessitating lateral separation of their respective drive shafts and without requiring the outer portions of the rolls to be made of flexible material.

Another object is to provide a new and improved cleaning roll for crop harvesters having the above characteristics which is unaffected in its operation by mud, grease and other foreign matter and which can be displaced laterally to permit rocks and other foreign matter to pass between a pair of adjacent such rolls.

Still another object is to provide a flexible insert which provides a roll with the above characteristics and which is easily replaceable without replacing the entire roll.

A further object is to provide a flexible insert as aforesaid having a diameter which can be varied to fit within rolls of slightly different sizes.

In furtherance of the above objects, an illustrated embodiment of the invention comprises a set of four parallel cleaning rolls of identical construction arranged in pairs in a beet harvester. Each roll includes an outer elongate, rigid metal tube with a helical rib on its outer surface which coacts with a rib on the other roll of the pair to convey beets along between the pair of rolls when the rolls are rotated in opposite directions. A drive shaft extends centrally through the outer tube and has ends rotatively secured in stationary mountings. The outer tube of each roll is spaced from its drive shaft and drivingly engaged therewith by a pair of cylindrical inserts, one fastened within each end of the tube. Each insert includes an outer metal casing and an inner, cylindrical rubber member bonded to the inside walls of the casing. A square metal sleeve extends through the center of the rubber member and is bonded to such member. The drive shaft extends through the sleeve, and a square portion of such shaft is drivingly engaged with the sleeve so that rotation of the shaft rotates the outer tube. Rocks and clumps of hard dirt of smaller diameter than the beets but of larger diameter than the spacing between rolls which are delivered onto the rotating rolls with the beets become wedged between the rolls of each pair, causing such rolls to separate to discharge such foreign objects without disturbing the stationarily mounted shafts and drive mechanism of the rolls and without discharging the beets on the rolls.

While the invention is illustrated in connection with cleaning and conveying rolls for beet harvesters, the flexible mounting feature described as applicable to other rotatable members as well.

The above and other objects and advantages of the invention will become apparent in the following detailed description and accompanying drawings wherein:

FIG. 1 is a schematic front view of the successive processing mechanisms of a beet harvester showing one way that beets are dug from the ground and conveyed through a harvester to a truck alongside the harvester;

FIG. 2 is a top plan view on an enlarged scale showing a set of cleaning rolls as used in the harvester of FIG. 1;

FIG. 2A is a fragmentary view on a slightly larger scale than FIG. 2 and taken along the line 2A—2A of FIG. 2, showing the slotted apertures in the mounting plate for the rolls which enable adjustment of the spacing between rolls;

FIG. 3 is a front end view of the cleaning rolls on the same scale as FIG. 2 and taken along the line 3—3 of FIG. 2;

Environment of rolls

Figure 4:
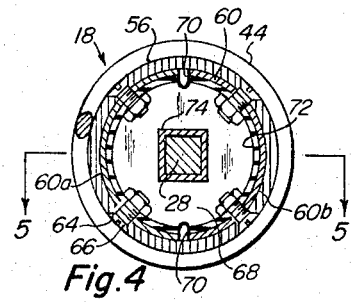
FIG. 4 is a cross-sectional view on a larger scale than FIG. 2 and taken approximately along the line 4—4 of FIG. 2 showing the details of construction of one cleaning roll.

With reference to the drawings, FIG. 1 illustrates diagrammatically a beet harvester H having two sets of digging wheels 10 at its front end, each set of which digs beets B from the ground and lifts them upwardly and rearwardly. Upon being lifted from the ground, the beets are knocked rearwardly from between each pair of wheels by rotating flexible flails 12 onto a tranversely arranged conveyor mechanism 14. The conveyor transports the beets B laterally to one side of the harvester where an elevating chain 16 lifts the beets upwardly and deposits them onto one end of a set of cleaning rolls 18. The cleaning rolls are disposed generally horizontally and extend transversely of the frame of the harvester for conveying beets from one side of the frame toward the opposite side thereof. At the opposite end of the rolls 18 the beets drop onto a second elevating chain 20 which lifts the cleaned beets laterally from the harvester and deposits them into a truck T alongside the harvester for transportation to a storage facility.

Prior to the above harvesting operation, the tops, or foliage portions, of the beets are usually removed by cutting discs (not shown), which may either be mounted on the harvester itself preceding the digging wheels or be incorporated as part of a piece of separate machinery which precedes the harvester along the rows to be harvested.

The details of construction of the elements of the harvester described thus far, with the exception of the cleaning rolls, are well known in the art and therefore such elements are not described in detail herein.

The cleaning rolls clean beets by rotating and jostling them as they are conveyed from one end of the rolls to the other, thereby knocking clods of dirt, hair roots and other field tare from the beets to put them in a marketable condition. The rolls should be as long as possible to clean the beets most effectively. In the illustrated embodiment, the rolls are arranged transversely on the frame of the harvester because it has been found that this arrangement is compact and yet enables utilization of relatively long rolls for a given frame size. Of course, the rolls may also be disposed in other positions on the frame, if desired, without affecting the functioning of the rolls.

Detailed description of rolls

The set of cleaning rolls 18 is shown in greater detail in FIGS. 2 and 3, and includes four closely spaced, parallel rolls arranged in two pairs, with the outer roll 18a and inner roll 18b comprising one pair and the inner roll 18c and outer roll 18d comprising the other pair of cooperating rolls. The entire set of rolls is mounted between opposed sideboards 22 secured at opposite ends to upright angle frame members 24, which define part of a rectangular frame enclosure for the rolls. Each sideboard 22 has an inwardly inclined lower edge portion 26 which deflects beets between the rolls of the adjacent pair of rolls. A deflecting rod 27 extends the length of the rolls at a position above and centrally between the two inner rolls 18b and 18c to prevent beets from dropping between such inner rolls and to deflect beets between the rolls of a pair.

With reference to roll 18a, each roll includes a drive shaft 28 which extends centrally through the roll and projects outwardly from the opposite ends thereof. The opposite ends of the drive shaft are rotatably mounted in bearing members 29, 30, which in turn are stationarily mounted, the bearing member 29 on upright channel 32 and the bearing member 30 on an end plate 34 which extends transversely of the rolls from one sideboard 22 to the other. The outer roll 18d is mounted in the same manner as described with respect to roll 18a, and the inside rolls 18b and 18c are similarly mounted except that the bearing members 29 therefor are mounted to an upright channel member 36 forming part of the rectangular frame support for the rolls.

The spacing between the rolls of each pair can be adjusted to meet varying field conditions. The adjustability is provided at the forward ends of the rolls by shims 38 between the bearings 29 and the frame members to which they are anchored. At the opposite rear ends of the rolls the spacing between rolls can be adjusted, as shown in FIG. 2A, by sliding the bearing members 30 and the corresponding ends of the drive shafts for the rolls in horizontally elongate openings 40 and 42, respectively, provided in the end plate 34. The distance between each roll of each pair of rolls is adjusted so that the smallest beets deposited onto the rolls from any given field will be easily supported between either pair of rolls.

Each roll 18 has a helical rib 44 on its outer surface extending the length of the roll. The rib of one roll 18a of a pair winds in a direction opposite to that in which the corresponding rib of the other roll 18b of the same pair winds. As viewed in FIG. 3, the rib 44 on the roll 18a winds in a clockwise direction whereas the rib on the roll 18b winds in a counterclockwise direction from the front ends to the rear ends of the rolls. Moreover, as viewed in FIG. 2 from the tops of the rolls, the ribs on the rolls of each pair are directly opposite one another.

Drive means are provided for rotating each of the rolls in opposite directions such that beets B deposited at the rear ends of the rolls, or at the top of FIG. 2, will be conveyed between a pair of rolls by the ribs to the front end of the rolls, at the bottom of FIG. 2. That is, as viewed in FIG. 3, the rolls of each pair rotate inwardly toward one another and downwardly, or, stating it another way, the outside roll 18a rotates in a clockwise direction whereas the inside roll 18b rotates in a counterclockwise direction. Each rib 44 extends above the surface of its roll a sufficient distance to coact with the rib on the other roll of the pair in pushing beets along between the rolls when the latter are rotated. The ribs may be formed, for example, from steel rod material and secured, as by welding, to the outer surface of the roll, that is, if such surface is metal.

The illustrated drive means for rotating the rolls is shown in FIG. 2 and includes a driven sprocket 46 secured to the rear end of each drive shaft 28 and an endless chain 48 which is trained about a drive sprocket 50 secured to a drive shaft 52. The drive shaft in turn is operatively connected by means (not shown) to the power takeoff shaft (not shown) of the tractor vehicle that tows the harvester. Assuming that the drive sprocket 50 and shaft 52 are driven in a clockwise direction as indicated by the arrow in FIG. 2, the drive chain 48 would pass underneath the driven sprocket 46 for the roll 18d, over the sprocket for the roll 18c, under the sprocket for the roll 18b and thence over the sprocket of the shaft for the roll 18a in order to drive the two pairs of rolls in the desired directions.

As shown in FIG. 3, clods of dirt, stones and other foreign matter F scraped from the beets by the cleaning rolls pass downwardly between the rolls of a pair without difficulty so long as the spacing between rolls is greater than the width of such foreign matter. Such matter drops onto a steeply inclined slide member 54 from which such matter slides out the back end of the harvester onto the portion of the field over which the harvester has just passed.

With the foregoing arrangement, it will be seen that unless some means are provided for separating the rolls of each pair when a hard foreign object is encountered of greater diameter than the space between the rolls but of smaller diameter than the beets, such object will either jam the rolls and cause serious damage thereto or the object would be conveyed along the roll, onto the elevator 20 and thence into the awaiting truck T with the beets. In accordance with the present invention, therefore, flexible means are provided for enabling separation of the rolls of each pair to pass such large foreign objects onto the slide 54 for discharge along with the smaller foreign matter, such means enabling separation of the rolls despite the fact that the drive shafts 28 for the rolls are stationarily mounted, and further despite the fact that the outer surface of the rolls may be constructed of a rigid, durable metal.

*Flexible mounting feature*

Figure 6:
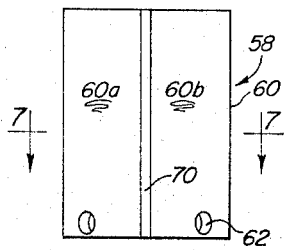
FIG. 6 is a side elevational view on the same scale as FIG. 4 showing the flexible insert of the invention.
Figure 5:
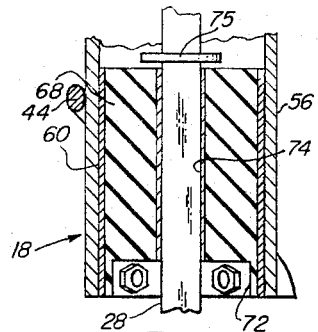
FIG. 5 is a fragmentary sectional view of the roll taken along the line 5—5 of FIG. 4.
Figure 7:
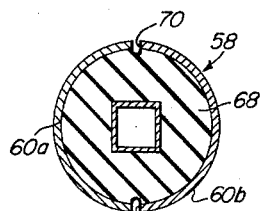
FIG. 7 is a cross-sectional view of the insert taken along the line 7—7 of FIG. 6.

The construction of the interior of each roll is illustrated in FIGS. 4 and 5. Each roll includes an outer tubular member 56 of elongate cylindrical shape having the helical rib 44 affixed to its outer surface. The drive shaft 28 extends through the center of the tube and is of square cross section throughout its major extent, but it is turned down into circular cross section at its opposite ends for mounting in the bearing members 29 and 30. Mounted within the opposite ends of the tube 56 are a pair of inserts 58, shown removed from the rolls in FIGS. 6 through 7. Each insert 58 is identical in construction to the other and includes an outer rigid metal casing 60 which is constructed in two semicylindrical halves 60a and 60b for a purpose to be explained below. Four equally spaced bolt holes 62 are provided at one end of the casing, and a similarly spaced set of countersunk holes 64 are provided at the opposite ends of the outer tube 56 for removably fastening the casing within an end of the tubular member by means of the flat head bolts and nuts 66.

A cylindrical member 68 made of molded rubber or other elastomer material is bonded, by a conventional process known to the vulcanizer, to the inner walls of the two halves of the casing 60 to fill the interior of the latter. The elastomer member 68 is of slightly greater overall diameter than the inner diameter of the casing 60, and the two halves 60a and 60b of the casing are arranged about the elastomer member so that gaps or slight spacings 70 are provided between the adjoining edges of the two halves. These gaps enable the outer diameter of the insert to be reduced slightly when desired by pressing together the halves 60a and 60b to fit within the end of a roll having an inner diameter slightly smaller than the normal outer diameter of the casing.

As clearly shown in FIG. 5, the length of the elastomer member 68 is slightly less than that of the casing 60, and one end of the member 68 is flush with one end of the casing so that the opposite end of the casing 60 containing the bolt holes 62 extends beyond the opposite end of the elastomer member 68 to facilitate fastening of the casing within the outer tube of the roll. However, the apertured end of the casing is lined on its inner surface with a relatively thin layer 72 of the same elastomer material as the member 68. This depressible layer provides an increased bearing surface for the nuts in the fastener assemblies 66 and also provides such fasteners, when tightened, with a prevailing back-off torque which resists counter-rotation and thus loosening of the mating threaded parts of the assembly. The elastomer lining 72 also extends along the adjoining edges of the two halves 60a and 60b of the casing to prevent the bare metal of such edges from abutting one another when the halves are pressed together.

Extending through a central opening in the elastomer member 68 and bonded to the walls of such opening is a square metal sleeve 74. The sleeve has a length coextensive with that of the elastomer member, and has an opening of a size to just receive a square section of the drive shaft 28 which, because of its square cross section, drivingly engages the sleeve. Thus, it will be apparent that torque applied to the drive shaft 28 through the sprocket and chain drive means shown in FIG. 2 will rotate the drive shaft, and such rotary motion will be transmitted through the sleeve 74, elastomer member 68 and casing 60 to the outer tubular member 56, causing the latter to rotate. As shown in FIG. 5, the portions of the drive shaft just inwardly of the pair of sleeves are preferably provided with stop means, such as the flange 75, to prevent axial sliding movement of the roll along the shaft.

The pair of flexible inserts as just described provide the only spacing means for supporting the outer tube 56 of the roll about the drive shaft 28 and for drivingly engaging the outer tubular portion of the roll with respect to the drive shaft. In practice, it has been found that a molded rubber member 68 having a durometer hardness index of approximately 35 and a length relative to the roll approximately as shown will provide the insert with sufficient torsional resistance to transmit torque from the drive shaft of a cleaning roll to the outer tube without appreciable wear and at the same time provide sufficient flexibility to permit the desired amount of deflection of the outer tube relative to its drive shaft. It will be apparent that the torsional resistance of the insert in any case can be increased or decreased as desired by increasing or decreasing correspondingly the length of the elastomer member.

*Operation*

Figure 8:
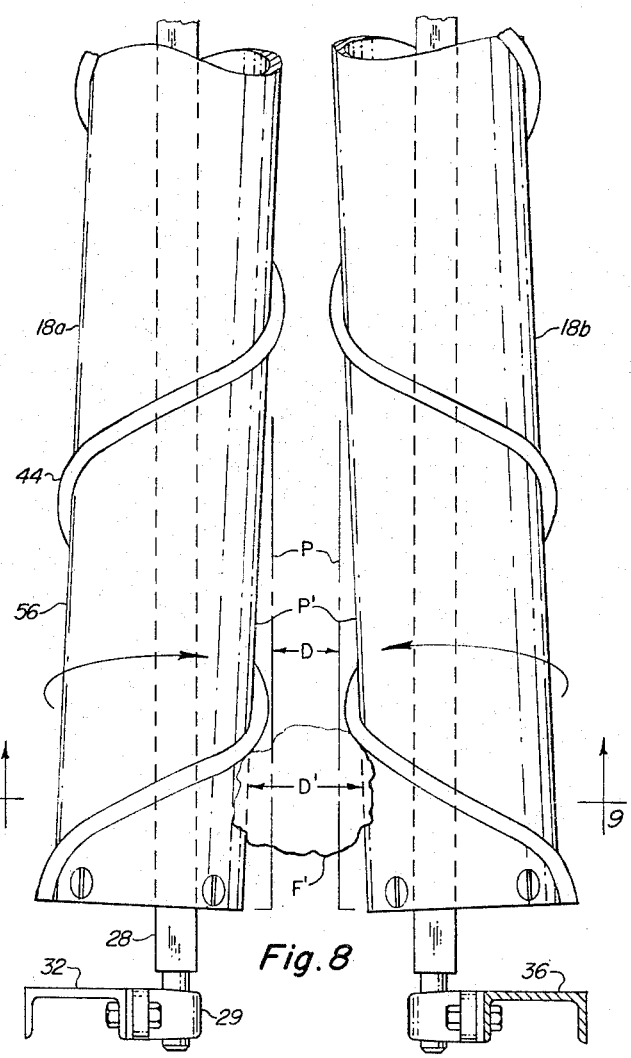
FIG. 8 is a partial plan view on the same scale as FIGS. 4 through 7 showing one pair of the rolls of FIG. 2 in a separated condition for passing foreign objects therebetween.
Figure 9:
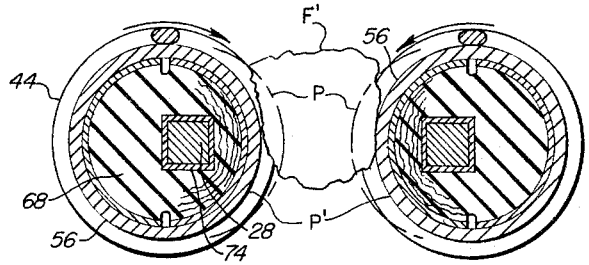
FIG. 9 is a cross-sectional view through the rolls of FIG. 8 taken along the line 9—9 of FIG. 8.

The operation of a pair of cleaning rolls incorporating the above-described inserts is illustrated in FIGS. 8 and 9. Normally the rolls are spaced a uniform distance D apart as indicated by the dashed line positions P of the rolls so that the smallest beets expected to be encountered in a given field will be supported between the rolls and conveyed therealong. Clumps of dirt, stones and other foreign objects of lesser diameter than the spacing D will pass between the rolls in their normal, undeflected positions. However, upon encountering a rock, hard clod of dirt or other hard foreign objects F having a slightly greater overall width or diameter than the spacing D between the rolls but generally a lesser diameter than the beets carried on the rolls, the pair of oppositely rotating rolls will grab the object F' and force it downwardly between the rolls.

As the object F' becomes wedged between the rolls, the outer tubes 56 of such rolls are forced apart adjacent the object to a position P' a sufficient distance D' to permit the object to pass downwardly between the rolls even though the drive shafts 28 therefor are stationarily mounted, since the elastomer portions 68 of the inserts permit the outer tubes 56 to deflect laterally relative to the shaft 28. As the outer tube of each roll shifts laterally, the portion of the elastomer member 68 between the object F' and the shaft 28 is squeezed, or compressed, while the portion of the elastomer member on the opposite side of the shaft from the compressed portion will be stretched, or in tension, as shown in FIG. 9. Immediately after the foreign object F' has passed beneath the roll, the compressed elastomer portions of the inserts spring back to their original shapes, causing the outer tubes 56 to spring back to their original positions P due to the elastomer interior of the insert.

The separated positions P' of the rolls in FIGS. 8 and 9 have been exaggerated for clarity of illustration. In practice, using an elastomer member having a durometer hardness index of approximately 35 and assuming a roll diameter of about four to six inches with a one-inch normal spacing between rolls, each roll could be deflected approximately an additional three-fourths inch to provide an additional separation of one and one-half inches, or a maximum separation of two and one-half inches so as to pass an object of about the same dimension. Normally beets range in size from about three inches up to about 12 inches in diameter so that a two and one-half inch separation would not permit any beets to pass downward between the rolls. In any case, the normal spacing between rolls should be adjusted so as to pass as large a foreign object as possible without passing any beets.

It is important to note that during the separation of the rolls and at all stages of operation of the rolls, the drive shafts 28 remain fixed in their bearings against linear movement and the only flexing that takes place is within the elastomer portions of the inserts of each roll. This feature eliminates any necessity of providing flexible shaft mountings and flexible drive means. The elastomer insert also enables use of a metal or other entirely rigid outer tube 56 having long-wearing qualities. Furthermore, in the event an insert should wear out or become damaged, it can be removed and replaced by another without replacing the entire roll, merely by removing the fasteners 66 and sliding the old insert from the tube and inserting a new one.

From the preceding description it will be apparent that the flexible mounting means described herein has utility, not only in beet cleaning rolls, but with any member rotatable about its own axis and especially for shaft-driven rolls, gears and the like.

While the flexible mounting feature of the invention has been illustrated with respect to an insert easily removable from the rolls, any elastomer spacing means between the outer shell of a rotatable member and the shaft about which such member rotates would provide the same advantages of flexibility as the insert herein described, regardless of whether or not such spacing means were integral with the outer tube or constructed as an insert. Moreover, while the flexible mounting means have been illustrated as short elastomer members within the opposite ends of a roll of much greater length than such members, the elastomer member could be of any length relative to the roll and could be positioned within any portion of the roll. No doubt other variations of the illustrated embodiment will occur to those skilled in the art having once inspected the foregoing disclosure.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. An insert for insertion within a hollow roll member for enabling lateral displacement of said roll member relative to a drive shaft extending through said roll member and fixedly mounted against movement in a direction transverse to the axis of said shaft,
said insert comprising:
  a rigid outer casing of a size to be just received within the interior of said roll member,
  means on said casing for securing said casing to said roll member so as to prevent relative rotation between said roll member and said casing,
  an elastomer member within said casing,
  said elastomer member being bonded to the interior walls of said casing,
  said elastomer member having a central opening therethrough,
  a rigid sleeve extending through said opening for receiving said drive shaft, said sleeve being bonded to the walls of said elastomer member defining said opening,
  said sleeve including means for drivingly engaging said drive shaft such that rotation of said drive shaft effects rotation of said insert and thereby rotation of said roll member.

2. An insert according to claim 1 wherein said casing comprises two semicylindrical half sections spaced from one another along their parting edge surfaces to define a gap therebetween such that the outside diameter of said casing can be reduced by squeezing said sections together to fit said insert within a roll having an inner diameter slightly less than the normal outer diameter of said casing.

3. An insert according to claim 1 wherein said sleeve is noncircular in cross section for drivingly engaging a shaft of similarly noncircular cross section.

4. An insert according to claim 1 wherein one end of said casing extends outwardly beyond the adjacent end of said elastomer member to form a flange having a series of holes therein for receiving fastening means for fastening said inserts to said roll member.

5. A pair of driven rolls disposed in side-by-side parallel relationship, each of said rolls comprising:
  an outer hollow rigid roll member,
  a drive shaft extending axially into said roll member,
  means for rotating said shaft,
  said shaft being fixed against movement laterally of its axis,
  and elastomer means supporting said outer roll member in spaced relation to said shaft and fixed to said shaft and to said outer roll member,
  said elastomer means being the sole means supporting said roll member on said shaft so that the shaft when rotated transmits driving force through said elastomer means to drive said roll and so that said pair of rolls can be momentarily separated without displacing their drive shafts.

6. A cleaning roll for a crop harvester and the like comprising:
  an outer cylindrical tube,
  a rib wound helically around said tube and extending from one end of said tube to the other,
  a cylindrical insert removably mounted within each of the opposite ends of said tube,
  means for securing said inserts to said tube for rotation therewith,
  a drive shaft extending centrally through said inserts,
  said inserts each including elastomer means extending between said shaft and said tube and normally supporting said tube concentrically about said shaft,
  and rigid sleeve means extending through said elastomer means for receiving and drivingly engaging said shaft such that torque applied to said shaft is transmitted through said inserts to said roll for rotating the same and such that said tube can be displaced laterally relative to the axis of said shaft while said shaft is stationarily mounted.

7. A roller comprising:
  a rigid outer tube,
  a pair of inserts removably mounted one within each of the opposite ends of said tube,
  each of said inserts comprising an outer cylindrical metal casing,
  means for removably fastening said casing to said tube,
  a sleeve member of noncircular cross-sectional shape extending through the interior of said casing,
  elastomer means within said casing and extending between the inner surface of said casing and the outer surface of said sleeve,
  said elastomer means being bonded to said casing and said sleeve and supporting said sleeve centrally within said casing,
  a drive shaft extending through said sleeve,
  the portion of said drive shaft within said sleeve being of the same cross-sectional shape as that of said sleeve and being snugly received within said sleeve for drivingly engaging the latter such that rotation of said drive shaft effects rotation of said outer tubular member and further such that said outer tubular member can be displaced laterally relative to said shaft.

8. A roller comprising:
  a rigid outer tube,
  a pair of elastomer members mounted one within each of the opposite ends of said tube, means fastening said elastomer members to said tube,
a sleeve member of noncircular cross-sectional shape extending centrally through each said elastomer member and defining an axial opening through said elastomer member,
each said elastomer member being bonded to said sleeve member and supporting said sleeve member centrally within said tube,
a drive shaft extending through said sleeve mmeber,
the portion of said drive shaft within said sleeve member being of the same cross-sectional shape as that of said sleeve member and drivingly engaging the latter so that rotary forces from said drive shaft are transmitted through said elastomer members to effect rotation of said outer tubular member and further so that said outer tubular member can be displaced laterally relative to said shaft.

9. A cleaning roll for a crop harvester and the like comprising:
an elongate cylindrical rigid tube,
a rib wound helically around said tube and extending from one end of said tube to the other,
an elastomer means within said tube,
means securing said elastomer means to the inside wall of said tube,
a drive shaft extending centrally through said elastomer means,
and rigid sleeve means extending through said elastomer means and drivingly engaging said elastomer means and said drive shaft so that rotary forces applied to said drive shaft are transmitted through said elastomer means to said roll for rotating the same and so that said tube can be displaced laterally relative to the axis of said shaft while said shaft is stationarily mounted.

References Cited by the Examiner
UNITED STATES PATENTS

| | | | |
|---|---|---|---|
| 322,324 | 7/1885 | Roberts | 29—129 X |
| 903,096 | 11/1908 | Kapp | 29—126 X |
| 1,733,893 | 10/1929 | Lynch | 29—123 |
| 1,955,713 | 4/1934 | Tomlin | 226—191 |
| 2,332,476 | 10/1943 | Thaxton | 29—123 |
| 2,699,903 | 1/1955 | Montgomery | 29—123 X |
| 2,803,126 | 8/1957 | Meyer | 29—126 X |
| 2,976,550 | 3/1961 | Silver et al. | 15—3.11 |

CHARLES A. WILLMUTH, *Primary Examiner.*
EDWARD L. ROBERTS, *Assistant Examiner.*